(12) United States Patent
Therrien et al.

(10) Patent No.: US 10,119,868 B2
(45) Date of Patent: Nov. 6, 2018

(54) HIGH SPEED DISTRIBUTED TEMPERATURE SENSING WITH AUTO CORRECTION

(71) Applicant: Halliburton Energy Services, Inc., Houston, TX (US)

(72) Inventors: Jason E. Therrien, Cypress, TX (US); Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 20 days.

(21) Appl. No.: 15/324,694

(22) PCT Filed: Sep. 17, 2014

(86) PCT No.: PCT/US2014/056079
§ 371 (c)(1),
(2) Date: Jan. 7, 2017

(87) PCT Pub. No.: WO2016/043733
PCT Pub. Date: Mar. 24, 2016

(65) Prior Publication Data
US 2017/0199088 A1    Jul. 13, 2017

(51) Int. Cl.
*G01J 5/08* (2006.01)
*G01K 15/00* (2006.01)
*G01K 11/32* (2006.01)
*G01J 5/00* (2006.01)

(52) U.S. Cl.
CPC .......... *G01K 15/005* (2013.01); *G01J 5/0821* (2013.01); *G01K 11/32* (2013.01); *G01J 2005/0048* (2013.01); *G01K 2011/324* (2013.01)

(58) Field of Classification Search
CPC .............................. G01K 15/00; G01N 21/65
See application file for complete search history.

(56) References Cited

U.S. PATENT DOCUMENTS

| | | | | |
|---|---|---|---|---|
| 7,855,780 B1 * | 12/2010 | Djeu | ..................... | G01N 21/65 250/339.07 |
| 8,496,376 B2 * | 7/2013 | Lee | ......................... | G01K 11/32 374/1 |
| 2006/0239330 A1 | 10/2006 | Yamate et al. | | |
| 2007/0165691 A1 | 7/2007 | Taverner et al. | | |
| 2007/0223556 A1 | 9/2007 | Lee et al. | | |
| 2009/0252193 A1 | 10/2009 | Hill et al. | | |
| 2010/0128756 A1 * | 5/2010 | Lee | ......................... | G01K 11/32 374/161 |
| 2013/0003777 A1 * | 1/2013 | Jaaskelainen | ......... | E21B 47/123 374/1 |
| 2013/0020486 A1 * | 1/2013 | Zhang | .................... | G01B 11/16 250/349 |

OTHER PUBLICATIONS

CA Application Serial No. 2,955,785, Office Action, dated Dec. 5, 2017, 3 pgs.

* cited by examiner

*Primary Examiner* — Casey Bryant
(74) *Attorney, Agent, or Firm* — Gilliam IP PLLC

(57) ABSTRACT

A system and method for a higher speed auto-correcting temperature measurement in a system using a fiber optic distributed sensor.

13 Claims, 5 Drawing Sheets

HIGH SPEED DISTRIBUTED TEMPERATURE SENSING WITH AUTO CORRECTION

BACKGROUND

This disclosure relates generally to temperature sensing, and more particularly, to dual source self-calibration or auto-correction systems and methods for distributed temperature sensing.

Fiber optic Distributed Temperature Sensing (DTS) systems were developed in the 1980s to replace thermocouple and thermistor based temperature measurement systems. DTS technology is often based on Optical Time-Domain Reflectometry (OTDR) and utilizes techniques originally derived from telecommunications cable testing. Today DTS provides a cost-effective way of obtaining hundreds, or even thousands, of highly accurate, high-resolution temperature measurements, DTS systems today find widespread acceptance in industries such as oil and gas, electrical power, and process control.

The underlying principle involved in DTS-based measurements is the detection of spontaneous Raman backscattering. A DTS system launches a primary light source pulse that gives rise to two back-scattered spectral components. A Stokes component that has a lower frequency and higher wavelength content than the launched light source pulse, and an anti-Stokes component that has a higher frequency and lower wavelength than the launched light source pulse. The anti-Stokes signal is usually an order of magnitude weaker than the Stokes signal (at room temperature) and it is temperature sensitive, whereas the Stokes signal is almost entirely temperature independent. Thus, the ratio of these two signals can be used to determine the temperature of the optical fiber at a particular point. The time of flight between the launch of the primary light source pulse and the detection of the back-scattered signal may be used to calculate the spatial location of the scattering event within the fiber.

One problem involved in the operation of DTS systems is proper calibration. DTS technology derives temperature information from two back-scattered signals that are in different wavelength bands. The shorter wavelength signal is the Raman anti-Stokes signal, the longer one is usually the Raman Stokes signal. After the light from the primary source at $\lambda_1$ is launched in a temperature sensing fiber, the scattered power arising from different locations within the optical fiber contained in the backscattered Stokes and anti-Stokes bands travel back to the launch end and gets detected by single or multiple detectors. As the Stokes and anti-Stokes signals travel, they suffer different attenuation profiles a $\alpha^{Stokes}$ ($a_S$) and $\alpha^{Anti-Stokes}$ ($a_{AS}$), respectively, due to the difference in the wavelength band for these two signals. For proper temperature measurement a correction needs to be made so that the two signals exhibit the same attenuation.

One approach that has been used is to assume that the attenuation profile is exponentially decaying as a function of distance. This creates an exponential function with an exponent called the Differential Attenuation Factor (DAF) that is multiplied by the Stokes signal to adjust the attenuation profile to that of the anti-Stokes signal. The ratio of the resulting two signals is then used to derive temperature. The DAF is the difference in attenuation ($a_{AS}$-$a_S$) between two different wavelengths.

The assumption of a smooth exponential decay however is not always a reality. A number of factors can cause the actual attenuation to deviate from the exponential form. Localized mechanical stress or strain, fiber crimping, chemical attack (eg. hydrogen ingression) all can induce abnormalities, and some of these can change with time. It has been recognized in the industry that some form of continuous calibration or auto-correction is needed to reduce all of these irregularities.

One successful approach for such continuous calibration or auto-s correction was described in U.S. Pat. No. 8,496,376 using a dual laser system to automatically correct for the differential attenuation that exists between the Raman Stokes and Anti-Stokes backscattered light. This is achieved by having the Rayleigh signal of one laser overlap with the Raman signal of the other laser. This approach can effectively negate the scattering effects that are not temperature dependent, resulting in a signal that only represents temperature effects. Such an approach requires however that the dual lasers must be fired alternately because the backscattered Rayleigh signal of each laser is much larger in size than the backscattered Raman signals, making it impossible to detect the backscattered Raman signals. This alternate firing of the lasers results in a reduced sampling rate for the system.

There is a need then for a much faster and more effective self-calibration or auto correction scheme.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

Figure 1:
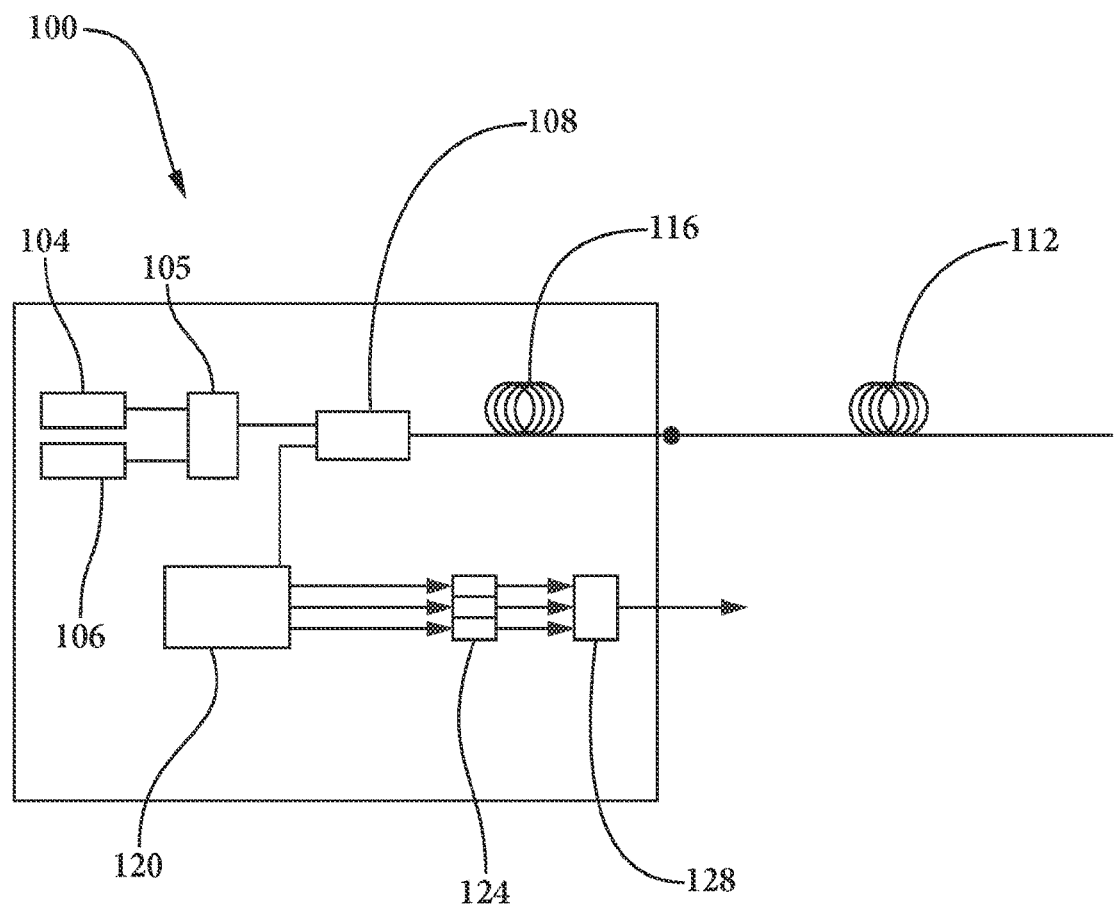
FIG. 1 illustrates a prior art dual laser distributed temperature system capable of performing a self-calibration or auto correction method.

FIG. 1, shown generally as the numeral 100 shows a block diagram of a prior art dual laser DTS system capable of performing a self-calibration or auto correction method. Primary light source 104 (wavelength $\lambda_1$) and secondary light source 106 (wavelength $\lambda_2$) may alternatively feed primary and secondary optical signals into sensing fiber 112 and reference fiber coil 116 via optical switch 105. When optical switch 105 is in a first position, primary source 104 produces primary back-scattered signals from sensing fiber 112. When optical switch 105 is in a second position, secondary source 106 produces secondary back-scattered signals from sensing fiber 112. Optical combiner/splitter 108 directs these mixed spectral components to optical filter 120, which separates the back-scattered components into the bands of interest, which may be the Rayleigh, Raman Stokes and Raman anti-Stokes frequencies of the primary or secondary light sources and then feeds them into photo-detectors 124. Three photo detectors are shown for illustrative purposes, but more are possible. The signals from photo-detectors are fed to a programmed signal processor 128 that outputs temperature as a function of location along sensing fiber 112.

Figure 2:
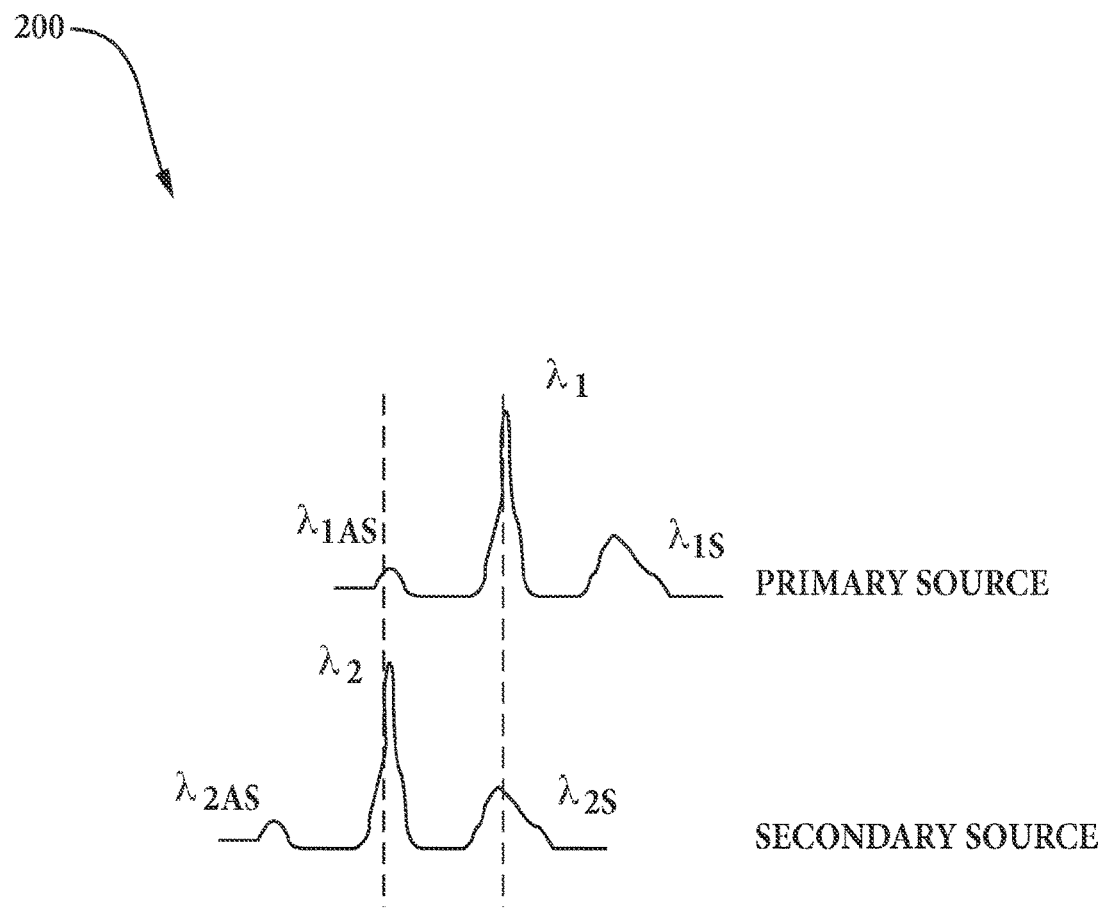
FIG. 2 illustrates primary and secondary light sources chosen to closely match the Raman anti-Stokes wavelength of the primary with the principle wavelength of the secondary source, resulting in closely matching the Ramen Stokes wavelength of the secondary source with the principle wavelength of the primary source.

In an example embodiment, the wavelength of the secondary source ($1\lambda_2$) is chosen to coincide with the anti-Stokes wavelength $\lambda_{1\_AS}$ of the primary source. This is shown in FIG. 2, shown generally by the numeral 200. If secondary source wavelength is chosen to match the anti-Stokes of the primary wavelength then the Stokes wavelength of the secondary is a close match to the primary wavelength $\lambda_1$. This configuration eliminates the need to use any Rayleigh signal for adjustments, and accurate temperature may be measured using only the Stokes and anti-Stokes signals.

A proven example of this example embodiment is a commercially available measurement light source of primary wavelength of 975 (nm) coupled with a correcting light source of 940 (nm). With Dual Laser Distributed Temperature Sensor (DTS) Systems the main goal is to automatically correct for differential attenuation that exists between the Raman Stokes and Anti-Stokes backscattered light. This is achieved by having the Rayleigh signal of one laser overlap with the Raman signal of the other laser. In this way you can effectively negate the scattering effects that are not temperature dependent, leaving you with a signal that only represents temperature effects.

In addition to this combination presented above three higher end combinations are suited to this application. One would be a commercially available measurement light source of primary wavelength of 1500 (nm) coupled with a correcting light source of 1410 (nm). Another would be a commercially available measurement light source of primary wavelength of 1550 (nm) coupled with a correcting light source of 1450 (nm). The third would be a commercially available measurement light source of primary wavelength of 1030 (nm) coupled with a correcting light source of 990 (nm).

This approach results in speed limitation issues if one wants to collect the Raman Stokes and Anti-Stokes signals at the same time since the Rayleigh signal is several 10's of dB larger than the Raman signal, and the receiver would be unable to detect the Raman signal. This disclosure proposes a way around this limitation of the dual laser technology and increases the sampling rate of a dual laser system by roughly a factor of 2.

This can be achieved by the addition of notch filters that match the wavelengths of the Rayleigh signals. Since the Raman spectrum is so wide and the Rayleigh spectrum is so narrow, subtracting it in this manner will not negatively impact performance.

Figure 3:
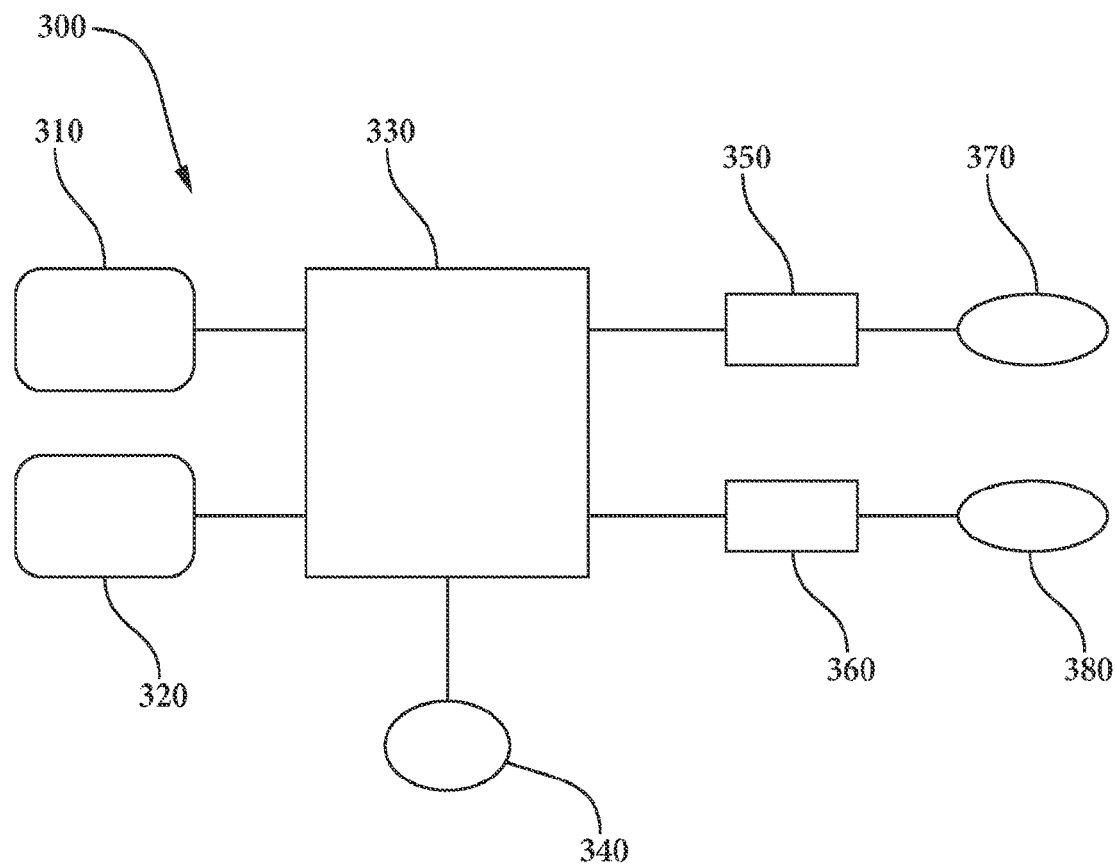
FIG. 3 illustrates a dual laser distributed temperature sensing system described in this disclosure that can perform a self-calibration or auto correction method and much higher speeds.

FIG. 3, shown generally as the numeral 300, illustrates a system that can do this. Illustrated herein is a two light source system, light sources 310 and 320. The light sources feed into a wave division multiplexer 330. The wave division multiplexer then combines the two different wavelengths and feed them into a distributed fiber optic sensor 340 into a region of interest to be measured.

Backscattered light signals from distributed fiber optic sensor 340 then return to wave division multiplexer 330 which separates the signals into the Raman anti-Stokes wavelength ($\lambda_{1\_AS}$) of the primary source $\lambda_1$ and the Raman Stokes signal ($\lambda_{2\_S}$) of the secondary source $\lambda_2$. As is illustrated in FIG. 2, each of these Raman backscattered signals from the primary and secondary sources would then be accompanied by the Rayleigh signals from the other source. The Raman backscattered anti-Stokes signal ($\lambda_{1\_AS}$) from primary source $\lambda_1$ then feeds through a notch filter 350 and into a first photo detector 370. Raman backscattered Stokes signal ($\lambda_{2\_S}$) from secondary source $\lambda_2$ then feeds through a notch filter 360 and into a second photo detector 380.

Figure 4:
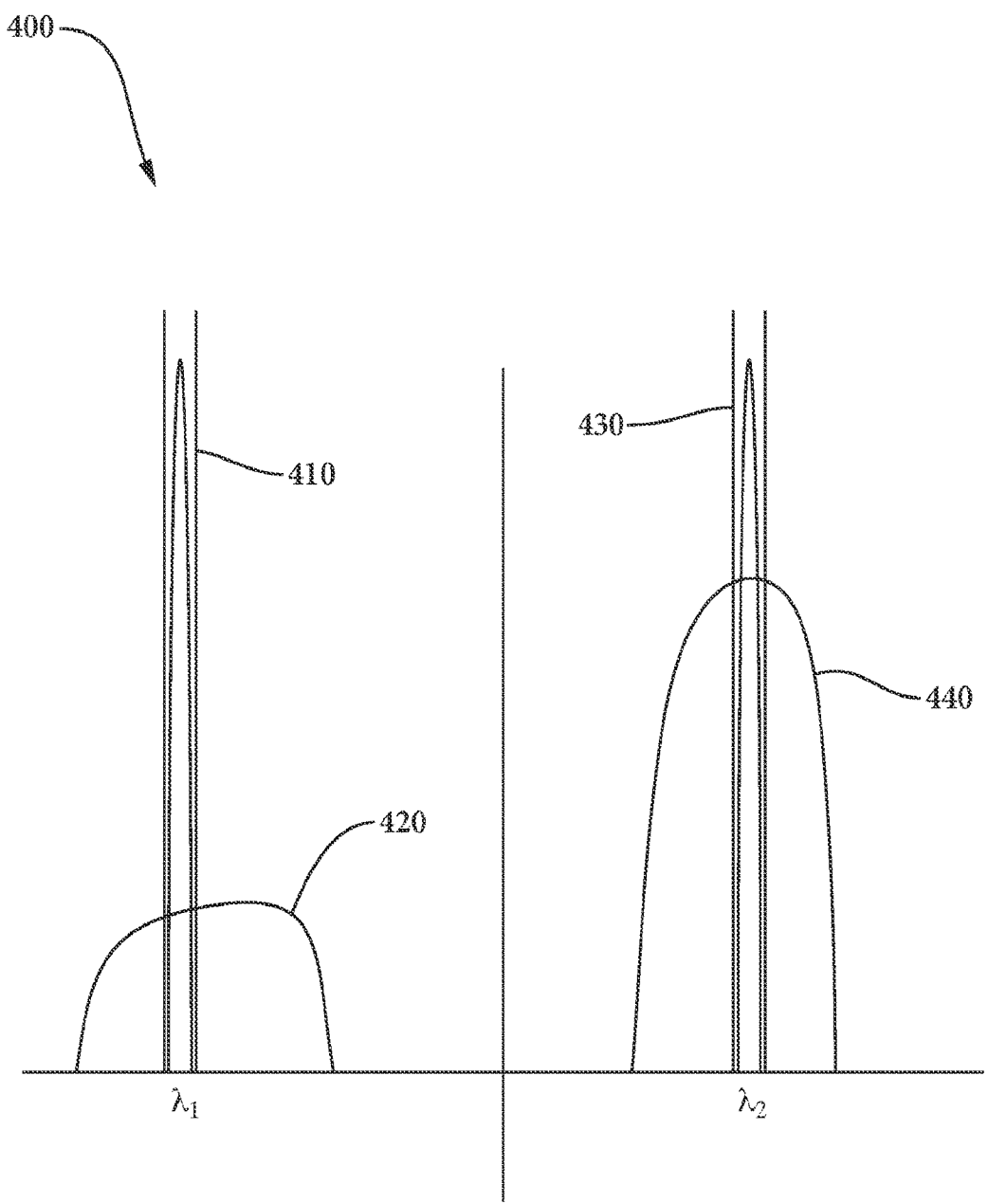
FIG. 4 illustrates the principle of using notch filters to filter out the much larger Rayleigh signals to enable continuous use of the backscattered Raman Stokes and anti-Stokes signals for self calibration or auto-correction.

The work of the notch filters can be seen in FIG. 4. As described earlier the two Raman spectrums are very wide and the Rayleigh spectrum is very narrow. The backscattered Raman anti-Stokes spectrum 420 from the primary light source is shown along with the very narrow backscattered Rayleigh spectrum from the secondary source $\lambda_2$. The notch filter 410 can be designed to filter out just the Rayleigh component. Likewise on the right hand side of the figure the backscattered Stokes spectrum 440 from the secondary light source $\lambda_2$ is shown along with the vary narrow backscattered Rayleigh spectrum from the primary source $\lambda_1$. Notch filter 430 then filters out just the Rayleigh component. Because the Raman spectrums are so wide and the Rayleigh spectrums so narrow, subtracting out the Rayleigh component still leaves very substantial Raman signals available to be measured by photo detectors 370 and 380. The two light sources can thus be fired continuously and the photo detectors can continuously measure the backscattered Raman signals.

Some notch filters may be passive and will have to be selected carefully for the light source wavelengths chosen. In other cases the notch filters are tunable by thermal or other means and may be tuned as closely as possible to the center wavelength of the Rayleigh wavelength of each light source. Both of these options are anticipated in this disclosure.

The signals from photo-detectors can then be fed to a programmed signal processor that outputs temperature as a function of location along the distributed fiber optic sensor 340 using art recognized computation methods that calibrate and measure the temperature distribution along the distributed fiber optic sensor based on the ratio of the intensity of the anti-Stokes band of the primary light source and the Stokes band of the secondary light source.

Figure 5:
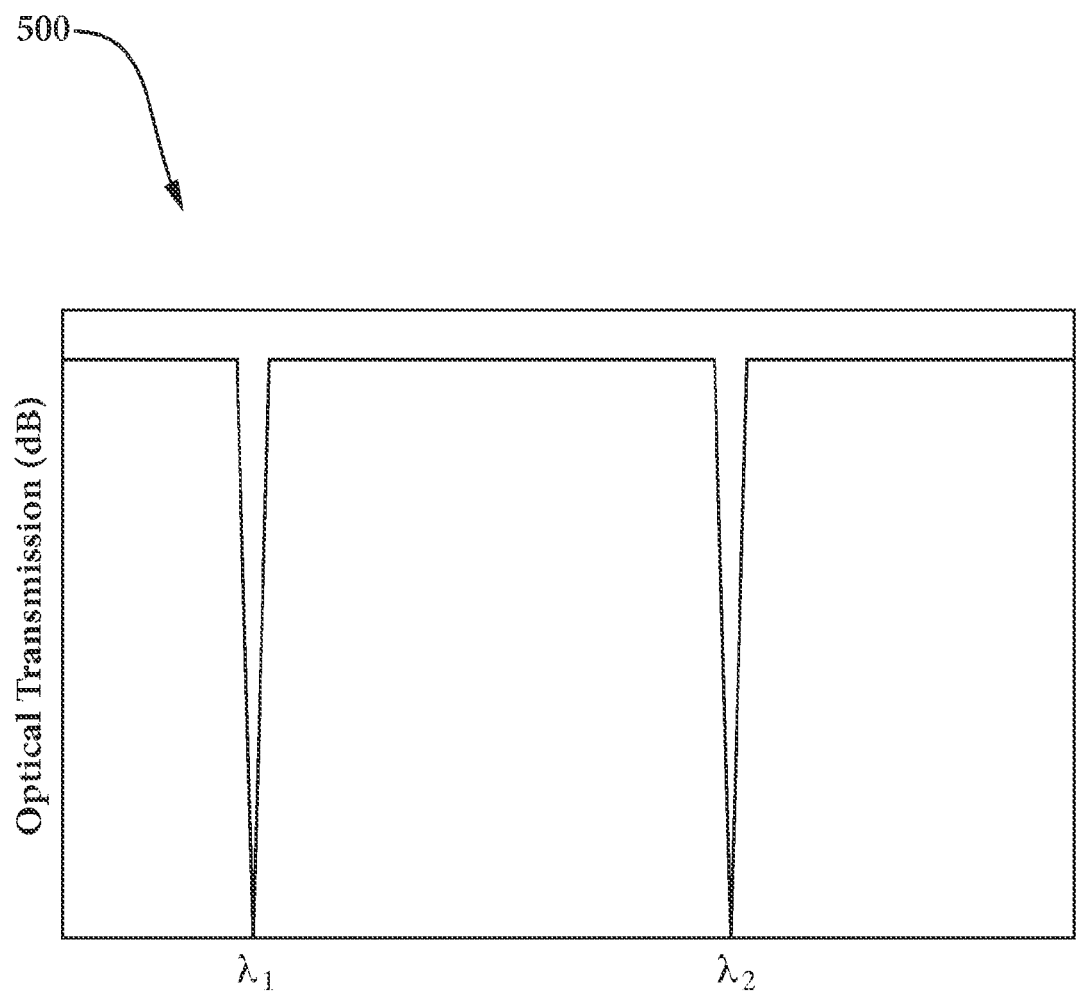
FIG. 5 illustrates the optical transmission spectra of the notch filters.

FIG. 5 illustrates the optical transmission spectra of the notch filters. The notch filter is chosen in such a way as to minimize the amount of Rayleigh backscatter that can make it to the detectors.

An aspect of this disclosure is then a system for auto-correcting temperature measurement in a system using a distributed fiber optic sensor including at least: a distributed fiber optic sensor; a primary light source for providing a back-scattered anti-Stokes band from said distributed fiber optic sensor; a secondary light source for providing a back-scattered Stokes band from said distributed fiber optic sensor; wherein the primary and secondary light sources are chosen so that the Rayleigh signal of the primary light source overlaps with the Raman Stokes signal of the secondary light source and the Rayleigh signal of the secondary light source overlaps with the Raman anti-Stokes signal of the primary light source; a wave division multiplexer (WDM) for receiving the primary light signal and the secondary light signal and passing the resulting signal into the distributed fiber optic sensor; wherein the WDM also acts as a de-multiplexer and separates the backscattered light from the fiber optic distributed sensor into an anti-Stokes band from the primary light source and a Stokes band from the secondary light source; two notch filters that that match the wavelengths of the Rayleigh signals of the primary and secondary light sources and receive the anti-Stokes band from the primary light source and a Stokes band from the secondary light source and filter out the Rayleigh signals of the primary and secondary light sources; two photo detectors for receiving the signals from the notch filters and measure the intensity of each; wherein the system for auto-correcting temperature measurement calibrates and measures the temperature distribution along said distributed fiber optic sensor based on the ratio of the intensity of the anti-Stokes band of the primary light source and the Stokes band of the secondary light source.

Another aspect of this disclosure is then a method of auto-correcting temperature measurement in a system using a fiber optic distributed sensor including at least: feeding a primary light source light pulse energy into a wave division multiplexer; feeding a secondary light source pulse energy into the wave division multiplexer to create a combined primary and secondary light source pulse energy; feeding the combined primary and secondary light source pulse energies into the distributed fiber optic sensor deployed into a region of interest; collecting back-scattered light energy from the distributed fiber optic sensor into the wave division multiplexer and separating the backscattered light energy into a Raman anti-Stokes wavelength of the primary light source and a Raman Stokes wavelength of the secondary light source; wherein the Raman anti-Stokes component will also include the Rayleigh wavelength of the backscattered secondary source and the Raman Stokes component will include the Rayleigh wavelength of the primary light source; feeding the Raman anti-Stokes wavelength of the primary light source through a notch filter that filters out the backscattered Rayleigh component of the secondary light source; feeding the Raman Stokes wavelength of the secondary light source through a notch filter that filters out the backscattered Rayleigh component of the primary light source; feeding the output of the two notch filters to two photo detectors to measure the signal intensities of backscattered anti-Stokes signal of the primary light energy and the back-scattered Stokes signal of the secondary light energy; and calculating a temperature using the backscattered anti-Stokes signal of the primary light energy and the back-scattered Stokes signal of the secondary light energy.

Current approaches to single mode DTS systems require long trace times. The method and apparatus described herein could cut that time by a factor of two.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system for auto-correcting temperature measurement comprising:
   a. a first source configured to provide a primary light signal;
   b. a second source configured to provide a secondary light signal;
   c. a distributed fiber optic sensor that receives the primary and secondary light signals and that is configured to generate back-scattered Stokes and anti-Stokes bands for each of the primary and secondary light signals, wherein a Rayleigh component of the primary light signal overlaps with the Stokes band of the secondary light signal and a Rayleigh component of the secondary light signal overlaps with the anti-Stokes band of the primary light signal;
   d. a wave division multiplexer (WDM) for continuously receiving the primary light signal and the secondary light signal and passing a resulting combined signal into the distributed fiber optic sensor; wherein the WDM also acts as a de-multiplexer, separating the backscattered light from the distributed fiber optic sensor into an anti-Stokes band from the primary light signal and a Stokes band from the secondary light signal;
   e. two notch filters that match the wavelengths of the Rayleigh components of the primary and secondary light signals and that continuously receive, from the WDM, the anti-Stokes band from the primary light signal and the Stokes band from the secondary light signal and filter out the Rayleigh components of the primary and secondary light signals;
   f. two photo detectors for receiving signals from the notch filters and measure the intensity of each;
   g. a signal processor configured to receive output from the photo detectors and to calibrate and measure the temperature distribution along said distributed fiber optic sensor based on the ratio of the intensity of the anti-Stokes band of the primary light signal and the Stokes band of the secondary light signal.

2. The system of claim 1, wherein said primary light signal has a wavelength of about 975 nanometers and said secondary light signal has a wavelength of about 940 nanometers.

3. The system of claim 1, wherein said primary light signal has a wavelength of about 1500 nanometers and said secondary light signal has a wavelength of about 1410 nanometers.

4. The system of claim 1, wherein said primary light signal has a wavelength of about 1550 nanometers and said secondary light signal has a wavelength of about 1450 nanometers.

5. The system of claim 1, wherein said primary light signal has a wavelength of about 1030 nanometers and said secondary light signal has a wavelength of about 990 nanometers.

6. The system of claim 1, wherein the notch filters are tuned to the center of the Rayleigh wavelength of each of the primary and secondary light signals.

7. A method of auto-correcting temperature measurement in a system using a distributed fiber optic sensor, said method comprising:

a. feeding a primary light source energy into a wave division multiplexer;
b. feeding, during said feeding the primary light source energy, a secondary light source energy into the wave division multiplexer to create a combined primary and secondary light source energy;
c. feeding the combined primary and secondary light source energies into the distributed fiber optic sensor;
d. feeding back-scattered primary and secondary light source energy from the distributed fiber optic sensor into the wave division multiplexer that is configured to separate the back-scattered light source energy into a Raman anti-Stokes component of the primary light source energy and a Raman Stokes component of the secondary light source energy;
e. feeding the Raman anti-Stokes component of the primary light source energy through a first notch filter that filters out a back-scattered Rayleigh component of the secondary light source energy;
f. feeding the Raman Stokes component of the secondary light source energy through a second notch filter that filters out a back-scattered Rayleigh component of the primary light source energy;
g. continuously feeding the output of the two notch filters to two photo detectors to measure the signal intensities of back-scattered anti-Stokes signals of the primary light source energy and back-scattered Stokes signals of the secondary light source energy; and
h. calculating a temperature using the back-scattered anti-Stokes signal of the primary light source energy and the back-scattered Stokes signal of the secondary light source energy.

8. The method of claim 7, wherein said primary light source energy has a wavelength of about 975 nanometers and said secondary light source enerav has a wavelength of about 940 nanometers.

9. The method of claim 7, wherein said primary light source energy has a wavelength of about 1500 nanometers and said secondary light source energy has a wavelength of about 1410 nanometers.

10. The method of claim 7, wherein said primary light source energy has a wavelength of about 1550 nanometers and said secondary light source energy has a wavelength of about 1450 nanometers.

11. The method of claim 7, wherein said primary light source energy has a wavelength of about 1030 nanometers and said secondary light source energy has a wavelength of about 990 nanometers.

12. The method of claim 7, wherein the notch filters are tuned to the center of the Rayleigh wavelength of each light source energy.

13. The method of claim 7, wherein said calculating step is performed without measuring or using differential attention profiles.

* * * * *